US011593166B2

(12) United States Patent
Kishan et al.

(10) Patent No.: US 11,593,166 B2
(45) Date of Patent: *Feb. 28, 2023

(54) USER PRESENCE PREDICTION DRIVEN DEVICE MANAGEMENT

(71) Applicant: Microsoft Technology Licensing, LLC, Redmond, WA (US)

(72) Inventors: Arun U. Kishan, Kirkland, WA (US); Emily Nicole Wilson, Seattle, WA (US); Mohammed Nashaat Soliman, Redmond, WA (US); Paresh Maisuria, Issaquah, WA (US); Shira Weinberg, Tel Aviv (IL); Gurpreet Virdi, Redmond, WA (US); Jared Brown, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 449 days.

This patent is subject to a terminal disclaimer.

(21) Appl. No.: 16/724,875

(22) Filed: Dec. 23, 2019

(65) Prior Publication Data

US 2020/0183747 A1 Jun. 11, 2020

Related U.S. Application Data

(63) Continuation of application No. 15/048,397, filed on Feb. 19, 2016, now Pat. No. 10,552,219.

(51) Int. Cl.
*G06F 9/46* (2006.01)
*G06F 9/50* (2006.01)
*G06N 5/043* (2023.01)
*G06N 7/00* (2023.01)

(52) U.S. Cl.
CPC ............ *G06F 9/5005* (2013.01); *G06F 9/46* (2013.01); *G06F 9/5027* (2013.01); *G06F 9/5088* (2013.01); *G06F 9/5094* (2013.01); *G06N 5/043* (2013.01); *G06N 7/005* (2013.01); *G06F 2209/502* (2013.01); *G06F 2209/509* (2013.01); *Y02D 10/00* (2018.01)

(58) Field of Classification Search
CPC ........ G06F 9/5005; G06F 9/46; G06F 9/5027; G06F 9/5088; G06F 9/5094; G06F 2009/502; G06F 2009/509; G06N 5/043; G06N 7/005

See application file for complete search history.

(56) References Cited

U.S. PATENT DOCUMENTS

| | | | | |
|---|---|---|---|---|
| 9,135,048 B2* | 9/2015 | Klein | ............... | G06F 9/5088 |
| 9,614,784 B1* | 4/2017 | Houston | ............. | H04L 67/1002 |
| 9,936,329 B2* | 4/2018 | Dearman | ............... | H04L 67/10 |
| 10,136,247 B2* | 11/2018 | Tarlton | ............... | H04L 67/10 |
| 2017/0111761 A1* | 4/2017 | Tarlton | ............... | H04W 24/02 |

FOREIGN PATENT DOCUMENTS

WO WO-2013132144 A1 * 9/2013 ........... G06F 9/5044

* cited by examiner

*Primary Examiner* — Diem K Cao
(74) *Attorney, Agent, or Firm* — Jacob P. Rohwer; Newport IP, LLC

(57) ABSTRACT

Pooling computing resources based on inferences about a plurality of hardware devices. The method includes identifying inference information about the plurality of devices. The method further includes based on the inference information optimizing resource usage of the plurality of hardware devices.

19 Claims, 2 Drawing Sheets

USER PRESENCE PREDICTION DRIVEN DEVICE MANAGEMENT

CROSS-REFERENCE TO RELATED APPLICATION(S)

This application is a continuation of and claims priority to U.S. patent application Ser. No. 15/048,397, filed Feb. 19, 2016, the disclosure of which is incorporated herein in its entirety.

BACKGROUND

Computers and computing systems have affected nearly every aspect of modern living. Computers are generally involved in work, recreation, healthcare, transportation, entertainment, household management, etc.

In the ordinary course of business and leisure, computer users often use multiple computing devices. For example, a computer user may use a cellular smart phone at various times. Contemporaneously, a user may use a laptop or desktop computer. Alternatively or additionally, a user may use a gaming system having large amounts of computing power. Alternatively or additionally, a user may use smart televisions, or other consumer electronic devices, which all have computing power. Each of these devices may also have various peripherals, such as cameras, microphones, screens, speakers, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for pooling computing resources based on inferences about a plurality of hardware devices. The method includes identifying inference information about the plurality of devices. The method further includes based on the inference information optimizing resource usage of the plurality of hardware devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein can identify inference information about a plurality of devices used by a user. From this inference information, embodiments can optimize resource usage of the plurality of hardware devices. For example, by predicting the user's presence across their array of devices (PCs, tablets, phones, videogame consoles, televisions, projectors, etc.), agents running on each of the devices can work together to efficiently pool resources which provide a better experience than any of the devices can offer alone and can save power and energy at the same time.

For example, consider a case where a user using a phone requests that the phone begin performing some processing activity that will use a large amount of computing resources on the phone. However, the phone knows, using inference information that the user will shortly likely be in close proximity to a desktop computer system. The phone could cause the processing to be delayed as a result of inferring that the user will shortly be proximate the desktop computer system. Once the user is in proximity of the desktop computer system, the processing could be offloaded to the desktop system. This could make the phone appear more efficient and save battery power at the phone as the processing could be offloaded to a desktop computing system that does not rely on battery power. Thus, a phone device with such functionality could be more power efficient than other phone devices.

Alternatively, consider a case where a user using a phone requests that the phone begin performing some processing activity that will use a large amount of computing resources on the phone. The phone is proximate a desktop computing system, and knows, using inference information that the user will likely stay in close proximity to the desktop computer system for some period of time. The phone could cause the processing to be offloaded to the desktop system, knowing that the desktop computing system will likely be able to complete the processing before the user leaves the proximity of the desktop computing system. This could make the phone appear more efficient and save battery power at the phone as the processing could be offloaded to a desktop computing system that does not rely on battery power.

Note that embodiments could take into account computing tasks to be performed, relative capabilities of devices, inference about device presence, etc., to determine what device perform computing tasks.

Design

Some embodiments illustrated herein include three major components:

(1) user presence inference across devices
(2) agent modelled device capabilities and resources
(3) real time understanding of device utilization
These are now each discussed in more detail below.

User Presence Inference

Figure 1:
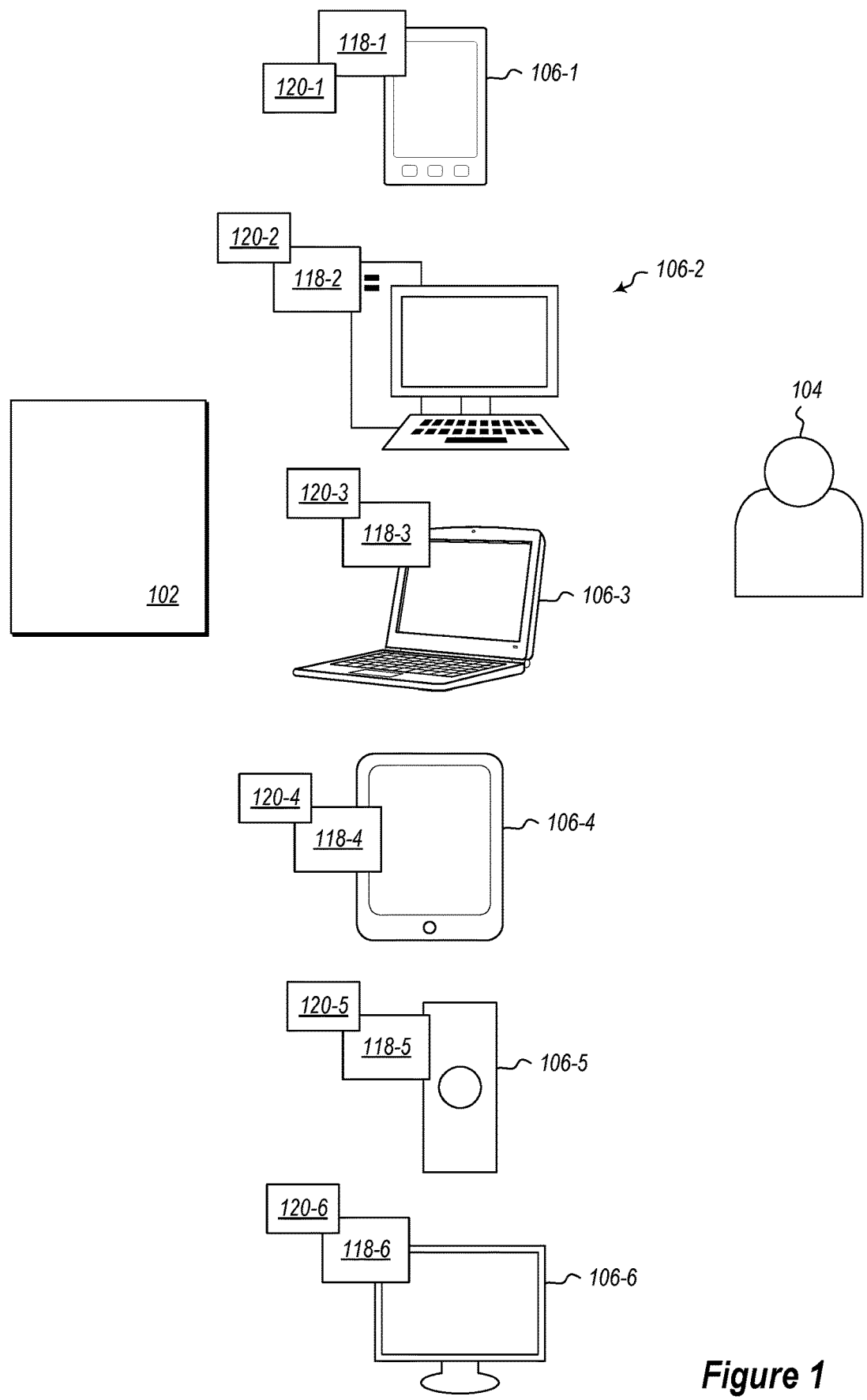
FIG. 1 illustrates a system for pooling resources based on inference information.

FIG. 1 illustrates an environment where embodiments may be practiced. In particular, FIG. 1 illustrates a personalization server 102. The personalization server 102 may be able to collect data for and about users of devices. For example, FIG. 1 also illustrates a user 104. The user 104 may use several different devices over the ordinary course of activities. For example, the user may use a smart cellular telephone device 106-1, a desktop computer device 106-2, a laptop device 106-3, a tablet device 106-4, a gaming device 106-5, a smart television device 106-6 or projector, etc. Each of these devices 106 may have an agent 118-1 through 118-6 that collects data about the user's use of the device 106 respectively, and provides such data to the personalization server 102. Alternatively, the agents may act in a peer to peer fashion such that the personalization server 102 could be eliminated and all such functionality that might be provided by the personalization server would instead be provided by the network of agents. Inference information could be calculated locally at each of the peers, centrally at a managing peer, or in other fashions Collected data may include usage pattern information such as information about when a device is used, where a device is used, how heavily a device is used, if the device is used with other devices, the type of activity that the user is engaging in (e.g., navigating towards a destination, starting a lengthy movie, etc.) what actions users take in certain activity contexts (e.g., raising or lowering volumes, silencing devices, activating certain modes, etc.) and any combinations of these to create usage patterns of information, etc. An example of the functionality provided by a personalization solution, such as one that includes the personalization server 102 and/or the agents (referred to generally as 118) is Cortana available from Microsoft Corporation of Redmond, Wash.

A personalization solution will leverage data from devices 106 to which the user 104 has signed in or otherwise self-identified. By measuring usage of a given devices 106, a model is developed that predicts the user's usage across their devices 106 for any given time, which may include consideration of factors such as day, date, month, year, etc. In particular, agents 118 can measure usage and provide such information to the personalization server 104 or amongst the agents 118.

Additional contextual user information further improves the model. For example additional context may include the location at which the device 106 is typically used at any given time. Local information is comprised of the user's last input, screen on/off state, remotely connected sessions, etc. Contextual data may further include the user's calendar, their predicted commute period, inactivity based on the usage of a different device and its location (e.g., one's phone) relative to a target device, etc.

Inferences can include a prediction accuracy or probability factor allowing for deviations in usage patterns. For example, a personalization solution can learn that the user 104 usually uses his work laptop device 106-3 on Monday starting at 8:00 am, but starts using it at 11:00 am on Tuesday and Wednesday. This could also extend to special events such as different usage patterns during holidays and vacations. However, a given user device usage pattern will likely not be consistent 100% of the time, and thus, a probability factor may be applied to inference information providing an indication of the likelihood that a pattern will occur.

The inference can also adapt to recognize multiple patterns and adjust the inference at runtime. For example, assume the user 104 has two common usage patterns. In one case, the user 104 is present at their work laptop device 106-3 from 8 am to 4 pm and then continues working for an hour at 10 pm. In another common case, the user is present at their work laptop device from 9 am to 7 pm with no further usage for that day. Thus, in some embodiments illustrated in this example, depending how the user starts their day, the inference will adapt dynamically to provide the most likely usage pattern based on the most recent user activity.

Agent Modelled Device Capabilities and Resources

In some embodiments, an agent 118 for a device 106 develops a model 120-1 through 120-6 of its device's capabilities. Both hardware and software (available applications and services) are included in the models 120-1 through 120-6. The models 120-1 through 120-6 are shared between the agents 118-1 through 118-6.

Simple sensors such as compasses, radios (Cell/LTE, GPS, Wi-Fi, etc.), memory, CPU, hard disk space, speakers, microphones, screens, projectors, etc., can be included in the model.

Complicated sensors such as infrared cameras, 3D cameras, microphone arrays, holographic screens, 3D printers, etc., can also be included in the model.

Applications running on the device, accounts, network resources, etc., can also be included in the model.

Real-Time Understanding of Device Utilization

Agents 118 running on each device 106 monitor the utilization of the device's resources. For example, CPU load, memory utilization, antennae/radio use, SIM presence as well as plan usage (voice, SMS, data), use of specialized hardware (apps running full screen, speakers playing music, etc.), location of the device, user-presence/activity on the device, etc. are all monitored in real-time by agents 118.

The real-time models 120 are shared between running agents 118 and updated as state changes. In some embodiments, if a device 106 is hibernating, the devices are not woken up to update the model or to receive model updates from agents on other devices rather, when the devices become active, the models can be updated on those devices. However, this may be implemented in other ways as well. For example, in some embodiments, if the models have changed beyond some threshold amount or in some significant way (as defined by a user, administrator, hard coding, or otherwise), then devices may be woken up to receive new model information. Alternatively or additionally, decisions about whether or not to wake up a device may be based on other factors such as whether or not the device is connected to external power, battery charge state of a device, probability that a device is about to be used or may be needed for some computing task, etc.

System

Based on usage patterns predicted by inference, the capabilities of each device 106 and the real-time utilization signals, the network of agents 118 can make optimal use of the devices resources.

Various examples are now illustrated.

One example illustrated herein includes functionality for using inference functionality to enable listening functionality using resources from multiple devices 106. In this example, multiple devices' microphones can be pooled to form a broad, ambient microphone array when in close physical proximity. By predicting when those devices are typically near each other, ambient listening applications can adapt to take advantage of the additional hardware the agent makes available. If a microphone becomes used and is no longer available, the model can allow another device to take its place, resulting in continual uptime via seamless hand-off.

Another example illustrated herein includes functionality for using inference functionality to enable watching functionality using resources from multiple devices 106. For example, some applications such as Windows Hello (available from Microsoft Corporation of Redmond, Wash.), XBOX Live sign-in (available from Microsoft Corporation of Redmond, Wash.) and potential future usage applications may implement certain levels of privacy based on presence or absence of people within viewing/hearing distance. This may be performed using a system of cameras to identify the user and the presence of other potential users in a given space. By predicting when the user is typically using a given device and which other camera-equipped devices are in the vicinity of that device, a pool of cameras can enable scenarios that are otherwise not possible with just one device. For example, a Windows Hello capable PC could wake up around the time the user typically arrives at a location with an ambient Cortana device that has no camera at all and enable seamless logon to the ambient Cortana device.

Another example illustrated herein includes functionality for using inference functionality to enable computing functionality using resources from multiple devices 106. For example, should one device's hardware sensors be available but its CPU is occupied with other tasks, the raw data can be streamed to a device with spare cycles to perform the computation. By understanding when the user is likely to consume resources, a secure tunnel between the devices can be pre-established ensuring little or no latency due to secure handshake or tunnel setup.

In another example, embodiments may be able to perform adaptive power saving operations based on inference information. For example, certain fitness tracker devices may be GPS devices embedded within them. A user may be out exercising with their fitness tracker device. Inference information may predict that a user is about to enter a wooded area where GPS functionality will not function (or that will not function well) and that the user is likely to remain in the wooded area for a given period of time. Using this information, embodiments could disable the GPS for some time based on the given period of time. This would result in energy savings for the fitness tracker device.

Similarly, inference information may be used to predict that a user is about to embark on a long run with both their fitness tracker device and their phone device. Due to the distance of the run, embodiments may share and/or offload certain tasks between the devices so that functionality will be available for the duration of the run. For example, if the battery power of the fitness tracker is low, GPS tracking can be offloaded to the phone device when a long run is anticipated. Alternatively, GPS tracking can be time division multiplexed between the two devices when a long run is anticipated to prolong battery power of one or more of the devices.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
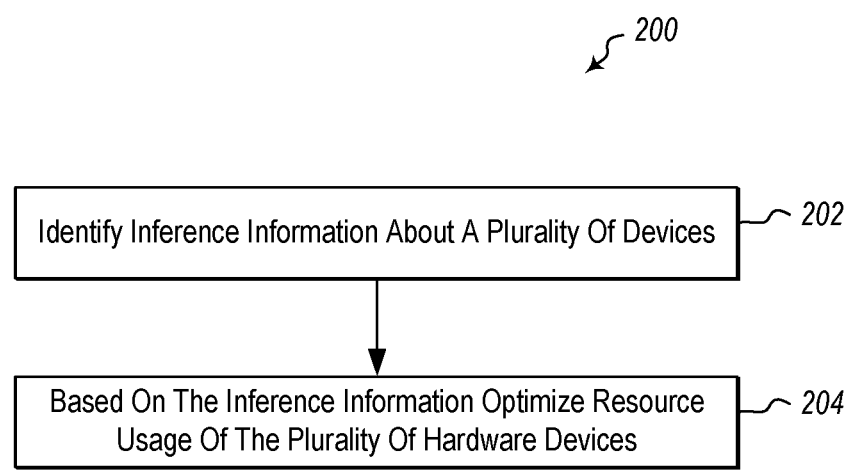
FIG. 2 illustrates a method of pooling resources based on inference information.

Referring now to FIG. 2, a method 200 is illustrated. The method 200 includes acts that may be practiced in a computing environment. The method 200 includes acts for pooling computing resources based on inferences about a plurality hardware devices.

The method 200 includes identify inference information about the plurality of devices (act 202). For example, as demonstrated above, the inference information may be included in, or derived from device models 120. The inference information may include information that can be used to infer when devices will be proximate each other. The inference information may include information that can be used to infer when devices will be performing computing tasks. The inference information may include information that can be used to infer when devices will have spare resources available. Such resources may be computing resources, such as spare CPU cycles. Such resources may be network resources, such as network hardware bandwidth that is not being used. Such resources may be storage resources, such as spare memory resources or mass storage resources that are available to be used. Such resources may be peripheral resources, such as various sensors that are not being used. Such resources may be applications that are available on devices.

The method 200 further includes, based on the inference information optimizing resource usage of the plurality of hardware devices (act 204). Various optimization examples will be illustrated below.

In one illustrative example, the inference information includes information identifying that the plurality of devices are likely to be proximate each within a given time. In one such embodiment, optimizing resource usage of the plurality of hardware devices may include delaying a computing operation in anticipation of the devices being in proximity to each other. For example, if embodiments know that a user is likely to have a phone device, and that the user and the phone device are likely to be proximate a laptop device or a desktop device at some time in the near future (where 'near future' is within some predetermined time), then computing on the phone device may be delayed until the devices are proximate each other. This could allow for processing to be offloaded from the phone device to the laptop device or desktop device making the phone device seem more efficient to the user.

In another example, the plurality of hardware devices may include a laptop device (or other mobile device) and a power supply. If the inference information indicates that a laptop device is likely to be coupled to a power supply in the near future, some computing tasks may be delayed until the laptop device is coupled to the power supply. This may allow the laptop device to be operated at higher computing power modes or may allow embodiments to delay processing for some power intensive, battery draining task, knowing that the device is anticipated to be coupled to a power supply in the near future.

In an alternative example, the plurality of devices may include a computing device and a particular network router. If inference information indicated that a computing device and a particular network router (e.g., coupled to a high capacity network, or the router itself having the ability to transfer large amounts of data) embodiments could delay some network intensive operation until the computing device and the network router are coupled together.

In some embodiments, the system may implement retry logic based on the inference information. For example, if a computing device is performing some operation that fails, the inference information may indicate that retrying the operation should be delayed as a better set of resources for performing the operation will likely be available within some predetermined time.

In some embodiments, deadline information may be used in conjunction with the inference information to make hardware device optimizations. For example, if a computing system knows a deadline for performing some computing task from the deadline information, but also knows from the inference information that certain resources are likely to be available soon on one or more highly capable devices, the operation can be postponed to be offloaded to the one or more highly capable devices.

The method 500 may be practiced where the inference information includes information identifying that the plurality of devices are likely to be in proximity to each other for a given period of time. Thus, computing decisions and device optimizations can be made in anticipation of devices being proximate each other for at least some period of time. Alternatively, the inference information indicating that the plurality of devices are likely to be in proximity to each other for a given period of time may indicate that after that time, it is likely that one or more of the devices will no longer be proximate each other.

Thus, for example, embodiments may prioritize certain computing tasks knowing that resources are likely to be lost after the given period of time. For example, consider an example where the system knows that a user is at home where their phone device and desktop device are in close proximity. The desktop device may automatically download podcasts and transfer them to the phone device. If the system of agents know that the user is likely to leave for work by some time, then the system may prioritize, at the desktop device, downloading the podcast and transferring it to the phone device to ensure that the podcast is available to the user before they leave for work.

In another example optimizing resource usage of the plurality of hardware devices may be used in transactional computing. For example, in some embodiments, optimizing resource usage of the plurality of hardware devices comprises offloading a transaction from a first device to a second device in proximity to the first device because the system determines, based on the inference information, that the transaction is likely to be completed prior to the first device and second device no longer being in close proximity to each other. Alternatively or additionally, embodiments may determine to not retry a transaction or suppress transaction retry logic on the second device because, based on the inference information, the first device and second device are not likely to be in proximity to each other for a sufficient amount of time and/or that hardware resources may be lost after the given period of time for the second device to complete the retry of the transaction.

Alternatively or additionally, embodiments may use inference information to prioritize work. Priorities may be based on what operations need to be performed and what resources are available, how long they will likely be available, what resources are likely to be available, when they are likely to be available, etc.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry out desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of managing a hardware resource of a computing device, the method comprising:
   receiving, at the computing device, a request to consume the hardware resource from the computing device for execution of a task;
   in response to receiving the request, determining, based on a usage model associated with the computing device, that access to functionality of the hardware resource of the computing device is to be lost after a period of time, the usage model containing records of one or more usage patterns of the computing device; and
   in response to determining that access to the functionality of the hardware resource of the computing device is to be lost after the period of time, prioritizing the execution of the task at the computing device over other tasks to be executed at the computing device before access to the functionality of the hardware resource of the computing device is lost.

2. The method of claim 1, further comprising:
   identifying, based on the usage model, another computing device that is proximate to the computing device; and
   offloading, from the computing device, the execution of the task to the other computing device.

3. The method of claim 1, further comprising:
   identifying, based on the usage model, another period of time after which the computing device has access to another computing device;
   determining whether the other period of time is within a predetermined threshold;
   in response to determining that the other period of time is within the predetermined threshold,
       preventing execution of the task at the computing device; and
       upon elapse of the other period of time, offloading, from the computing device, the execution of the task to the other computing device.

4. The method of claim 1, wherein the hardware resource includes at least one of processor cycles, network bandwidths, memory capacity, or storage capacity.

5. The method of claim 1, wherein the one or more usage patterns include records individually containing data representing a time, a location, and one or more activities performed at the time and the location by the computing device and another computing device.

6. The method of claim 1, further comprising selecting one of the one or more usage patterns based on a time or a location at which the request is received.

7. The method of claim 1, further comprising:
   in response to determining that access to the functionality of the hardware resource of the computing device is to be lost after the period of time,
       determining, based on the usage model, whether the computing device and another computing device are proximate to each other such that a user has access to both the computing device and the other computing device; and
   in response to determining that the computing device and the other computing device are proximate to each other such that the user has access to both the computing device and the other computing device, executing the task using the hardware resource from both the computing device and the other computing device.

8. A server for managing a hardware resource of a computing device, the server comprising:
   a processor; and
   a memory operatively coupled to the processor, the memory having instructions executable by the processor to cause the server to:
       upon receiving a request to consume the hardware resource of the computing device for execution of a task, determine, based on a usage model associated with the computing device, that access to functionality of the hardware resource of the computing device is to be lost after a period of time, the usage model containing records of one or more usage patterns of the computing device; and
       in response to determining that access to the functionality of the hardware resource of the computing device is to be lost after the period of time, prioritize the execution of the task at the computing device over other tasks to be executed at the computing device before access to the functionality of the hardware resource of the computing device is lost.

9. The server of claim 8, wherein the hardware resource includes at least one of processor cycles, network bandwidths, memory capacity, or storage capacity.

10. The server of claim 8, wherein the one or more usage patterns include records individually containing data representing a time, a location, and one or more activities performed at the time and the location by the computing device.

11. The server of claim 8, wherein the memory includes additional instructions executable by the processor to cause the server to:
   identify, based on the usage model, another computing device that is accessible to the computing device; and
   offload, from the computing device, the execution of the task to the other computing device.

12. The server of claim 11, wherein the memory includes additional instructions executable by the processor to cause the server to select one of the one or more usage patterns based on a time or a location at which the request is received and utilize the selected usage pattern to determine whether a user has access to the other computing device.

13. The server of claim 8, wherein the memory includes additional instructions executable by the processor to cause the server to:
determine, based on the usage model, that the computing device is to lose access to another computing device after the period of time; and
instruct the other computing device to prevent additional tasks from being offloaded to the computing device.

14. The server of claim 8, wherein the memory includes additional instructions executable by the processor to cause the server to:
determine, based on the usage model, whether the computing device and another computing device are proximate to each other such that a user has access to both the computing device and the other computing device; and
in response to determining that the computing device and the other computing device are proximate to each other such that the user has access to both the computing device and the other computing device, execute the task using the hardware resource from both the computing device and the other computing device.

15. A method of managing a hardware resource of a first computing device and a second computing device, the method comprising:
receiving, at the first computing device, a request to consume the hardware resource for execution of a task;
in response to receiving the request, determining, based on a usage model associated with the first computing device and the second computing device, that the first computing device has access to the second computing device for a period of time, the usage model containing records of one or more usage patterns of both the first computing device and the second computing device;
in response to determining that the first computing device has access to the second computing device for the period of time,
delaying execution of the task at the first computing device; and
offloading, from the first computing device to the second computing device, the execution of the task thereby avoiding consumption of the hardware resource by the first computing device during the period of time.

16. The method of claim 15, wherein the hardware resource includes at least one of processor cycles, network bandwidths, memory capacity, or storage capacity.

17. The method of claim 15, further comprising selecting one of the one or more usage patterns based on a time or a location at which the request is received and using the selected usage pattern to determine whether a user has access to the second computing device for the period of time.

18. The method of claim 15, further comprising:
determining, based on the usage model, whether the first computing device is to lose access to the second computing device after the period of time; and
in response to determining that the first computing device is to lose access to the second computing device after the period of time, prioritizing execution of the task at the second computing device over other tasks executed at the second computing device.

19. The method of claim 15, further comprising:
determining, based on the usage model, whether the first computing device and the second computing device are proximate to each other such that a user has access to both the first computing device and the second computing device for the period of time; and
in response to determining that the first computing device and the second computing device are proximate to each other such that the user has access to both the first computing device and the second computing device for the period of time, executing the task using the hardware resource from both the first computing device and the second computing device.

* * * * *